United States Patent
Sukeda et al.

(10) Patent No.: US 9,273,771 B2
(45) Date of Patent: Mar. 1, 2016

(54) METHOD FOR MANUFACTURING MULTI-STAGE GEAR, AND MULTI-STAGE GEAR

(75) Inventors: Takuya Sukeda, Okazaki (JP); Hirofumi Inoshita, Nagoya (JP); Koji Shimoda, Toyota (JP); Akinori Tomioka, Nagoya (JP); Toshiaki Masui, Toyota (JP); Hironori Aoyama, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 33 days.

(21) Appl. No.: 14/130,715

(22) PCT Filed: Jul. 8, 2011

(86) PCT No.: PCT/JP2011/065704
§ 371 (c)(1),
(2), (4) Date: Jan. 3, 2014

(87) PCT Pub. No.: WO2013/008285
PCT Pub. Date: Jan. 17, 2013

(65) Prior Publication Data
US 2014/0144269 A1 May 29, 2014

(51) Int. Cl.
*F16H 55/02* (2006.01)
*B23P 15/14* (2006.01)
*F16H 55/17* (2006.01)
*B21H 5/02* (2006.01)
*B21K 1/30* (2006.01)

(52) U.S. Cl.
CPC .............. *F16H 55/02* (2013.01); *B21H 5/02* (2013.01); *B21K 1/30* (2013.01); *B23P 15/14* (2013.01); *F16H 55/17* (2013.01); *Y10T 29/49476* (2015.01); *Y10T 74/1987* (2015.01)

(58) Field of Classification Search
CPC ........... F16H 55/02; F16H 55/17; B21K 1/30; B21H 5/02; B23P 15/14; Y10T 29/49476; Y10T 74/1987
See application file for complete search history.

(56) References Cited

U.S. PATENT DOCUMENTS 5,363,714 A    11/1994  Hoguchi

FOREIGN PATENT DOCUMENTS

| EP | 0552021 A1 | 7/1993 |
| JP | 07-112234 A | 5/1995 |
| JP | 07-155879 A | 6/1995 |
| JP | 09-300041 A | 11/1997 |
| JP | 11-300447 A | 11/1999 |
| JP | 2009-156369 A | 7/2009 |
| JP | 2011-033123 A | 2/2011 |

*Primary Examiner* — Moshe Wilensky
(74) *Attorney, Agent, or Firm* — Kenyon & Kenyon LLP

(57) ABSTRACT

In a method for manufacturing a multi-stage gear in which no gap is formed between a small-diameter gear and a large-diameter gear, there are included a first step of forming the small-diameter gear on an outer peripheral surface of a workpiece, a second step of forming a large-diameter gear part by plastically deforming an end portion of the workpiece to increase the diameter thereof, and a third step of forming the large-diameter gear by cutting the large-diameter gear part.

3 Claims, 9 Drawing Sheets

METHOD FOR MANUFACTURING MULTI-STAGE GEAR, AND MULTI-STAGE GEAR

CROSS-REFERENCE TO RELATED APPLICATIONS

This is a national phase application based on the PCT International Patent Application No. PCT/JP2011/065704 filed on Jul. 8, 2011, the entire contents of which are incorporated herein by reference.

TECHNICAL FIELD

The present invention relates to a method for manufacturing a multi-stage gear including gears having different diameters formed on an outer peripheral surface of a hollow cylindrical workpiece, and the multi-stage gear.

BACKGROUND ART

A multi-stage gear is produced by forming a large-diameter gear and a small-diameter gear different in diameter on an outer peripheral surface of a workpiece. The multi-stage gear is used as a pinion or a sun gear mainly for use in a transmission of a vehicle. To be concrete, it is used as a gear for a transmission of an AT car, MT car, or CVT and also for an engine.

FIG. 11 shows a multi-stage gear 300 in Patent Document 1, which is a conventional art. As shown in FIG. 11, the multi-stage gear 300 includes a small-diameter gear 301 and a large-diameter gear 302, and formed with a center hole 304 through the center. Further, a gap or interval 303 is formed between the small-diameter gear 301 and the large-diameter gear 302.

The multi-stage gear 300 is produced in such a manner that a material is formed into a shape approximate to a final two-stage gear having two-staged outer periphery by hot forging in a first step. In a second step, the small-diameter gear 301 and the large-diameter gear 302 are formed by cold forging. Successively, the small-diameter gear 301 is subjected to teeth cutting by use of teeth cutting blade. For this purpose, the gap 303 has to be formed in order to avoid the blade from hitting the large-diameter gear 302.

One of the multi-stage gears is a divided gear consisting of a large-diameter gear and a small-diameter gear which are separate members. This divided gear is produced in such a way that the large-diameter gear and the small-diameter gear are made of separate members, and then they are joined together into a one-piece divided gear.

RELATED ART DOCUMENTS

Patent Documents

Patent Document 1: JP-A-2009-156369

SUMMARY OF INVENTION

Problems to be Solved by the Invention

However, a method for manufacturing a conventional multi-stage gear, and the multi-stage gear have the following problems. Specifically, when the multi-stage gear 300 is to be produced by cutting using the teeth cutting blade, the gap 303 is inevitably formed between the small-diameter gear 301 and the large-diameter gear 302. This gap 303 formed therein will cause a problem with difficulty in space saving demanded in motor vehicle industry in which the multi-stage gear is mainly used. Even when a rolling technique is used instead of cutting, a gap is needed to allow a residual material to flow between the small-diameter gear and the large-diameter gear in forming the small-diameter gear. Thus, the gap could not be eliminated.

On the other hand, to eliminate forming of a gap, it is conceivable to form a large-diameter gear after the small-diameter gear is formed. For this purpose, it is necessary to firmly retain the small-diameter gear by a complex device configuration to avoid deformation of the small-diameter gear; however, this configuration will cause problems with difficulty in ensuring accuracy and increased costs.

For the divided gear, the large-diameter gear and the small-diameter gear are joined together after their production, resulting in low strength. Due to the need for such joining, a joining step is additionally required and the accuracy is hard to be ensured, leading to increased costs.

The present invention has been made to solve the above problems and has a purpose to provide a method for manufacturing a multi-stage gear in which no gap is present between a small-diameter gear and a large-diameter gear at low cost, and the multi-stage gear.

Means of Solving the Problems

To achieve the above purpose, one aspect of the invention provides the following configurations.

(1) In a method for manufacturing a multi-stage gear formed with gears having different diameters on an outer peripheral surface of a hollow cylindrical workpiece, the method includes: a first step of forming a small-diameter gear on the outer peripheral surface; a second step of forming a large-diameter gear part by plastically deforming an end portion of the workpiece to increase a diameter thereof; and a third step of forming a large-diameter gear by cutting the large-diameter gear part.

(2) In the method for manufacturing a multi-stage gear described in (1), preferably, the plastic deformation in the second step includes widening the diameter of the end portion in a radial direction and bending the diameter-widened end portion toward the small-diameter gear.

(3) In the method for manufacturing a multi-stage gear described in (2), preferably, the second step uses a flanged roller for the plastic deformation.

(4) In the method for manufacturing a multi-stage gear described in (2), preferably, the second step includes hammering for the plastic deformation, and the hammering uses a hammer having a contact area smaller than a cross sectional area of the small-diameter gear.

(5) In the method for manufacturing a multi-stage gear described in one of (1) to (4), preferably, the second step includes heating the end portion of the workpiece by high-frequency heating.

(6) Another aspect of the invention provides, in the multi-stage gear manufactured by the multi-stage gear manufacturing method described in (1), an end portion of the small-diameter gear and an end portion of the large-diameter gear are located in overlapping positions in an axial direction.

(7) In the multi-stage gear manufactured by the multi-stage gear workpiece method described in (1), an end face of the small-diameter gear and an end face of the large-diameter gear are located in about the same positions in an axial direction.

(8) In the multi-stage gear described in (6) or (7), preferably, the multi-stage gear is a single-piece multi-stage gear formed with the large-diameter gear on at least one side of the small-diameter gear.

Effects of the Invention

Next, operations and advantageous effects of the method for manufacturing a multi-stage gear, and the multi-stage gear according to the invention will be explained. An aspect (1) provides a method for manufacturing a multi-stage gear formed with gears having different diameters on an outer peripheral surface of a hollow cylindrical workpiece, the method including: a first step of forming a small-diameter gear on the outer peripheral surface; a second step of forming a large-diameter gear part by plastically deforming an end portion of the workpiece to increase a diameter thereof; and a third step of forming a large-diameter gear by cutting the large-diameter gear part. Accordingly, the multi-stage gear in which no gap is formed between the small-diameter gear and the large-diameter gear can be manufactured. The multi-stage gear formed with no gap between the small-diameter gear and the large-diameter gear represents a multi-stage gear in which the end portion of the small-diameter gear and the end portion of the large-diameter gear are located in overlapping positions in the axial direction and a multi-stage gear in which the end face of the small-diameter gear and the end face of the large-diameter gear are located in about the same positions in the axial direction.

Such a multi-stage gear formed with no gap between the small-diameter gear and the large-diameter gear can save the space corresponding to the gap. This results in space saving in the multi-stage gear when it is mounted in a machine.

Even when the large-diameter gear is formed after formation of the small-diameter gear, there is no need to firmly retain the small-diameter gear by a complex device configuration to avoid deformation of the small-diameter gear. This can easily ensure the accuracy and reduce cost as compared with a conventional multi-stage gear.

Since the multi-stage gear is manufactured by plastic deformation, it can provide higher strength than the divided gear. Because of no necessity of joining and assembling, the multi-stage gear can be manufactured with high coaxial accuracy at low cost.

According to the configuration (2), in addition to the operations and effects described in (1), the plastic deformation in the second step includes widening the diameter of the end portion in a radial direction and bending the diameter-widened end portion toward the small-diameter gear. This can restrain deformation of the small-diameter gear to a minimum. To be concrete, firstly, the end portion of the workpiece is widened in diameter in the radial direction with respect to a cylindrical portion of the workpiece. When the end portion of the workpiece is plastically deformed in the radial direction of the cylindrical portion, this deformed portion is a portion far from the small-diameter gear, and hence the deformation of the small-diameter gear can be reduced to a minimum. Secondly, after the end portion of the workpiece is plastically deformed by a constant amount in the radial direction of the cylindrical portion, the end portion is bent toward the small-diameter gear. When the end portion is to be plastically deformed toward the small-diameter gear, the end portion being far from the small-diameter gear, the deformation of the small-diameter gear can be reduced to a minimum. Consequently, even when the large-diameter gear part is formed, the deformation of the small-diameter gear can be minimized.

According to the configuration (3), in addition to the operations and effects described in (2), the second step uses a flanged roller for the plastic deformation. Thus, the end portion can be easily widened radially and the diameter-widened end portion can be bent toward the small-diameter gear. Specifically, the end portion is widened radially by a roller portion and the end portion is bent toward the small-diameter gear by a flange, i.e., in a sequence of operations.

According to the configuration (4), in addition to the operations and effects described in (2), the second step includes hammering for the plastic deformation, and the hammering uses a hammer having a contact area smaller than a cross sectional area of the small-diameter gear. Thus, a load during forming (a forming load) can be reduced. Accordingly, even when the large-diameter gear is formed after formation of the small-diameter gear, the large-diameter gear can be formed while the deformation of the small-diameter gear can be minimized. It is further possible to radially widen the end portion by hammering and bend the diameter-widened end portion toward the small-diameter gear.

According to the configuration (5), in addition to the operations and effects described in (1) to (4), the second step includes heating the end portion of the workpiece by high-frequency heating. Thus, deformation resistance can be reduced. This makes it possible to reduce a forming load required to form the large-diameter gear, and further minimize deformation of the small-diameter gear.

According to the configuration (6) or (7), in the multi-stage gear manufactured by the multi-stage gear manufacturing method described in (1), an end portion of the small-diameter gear and an end portion of the large-diameter gear are located in overlapping positions in an axial direction. Alternatively, an end face of the small-diameter gear and an end face of the large-diameter gear are located in about the same positions in an axial direction. Thus, the multi-stage gear formed with no gap between the small-diameter gear and the large-diameter gear is achieved. Such a multi-stage gear formed with no gap between the small-diameter gear and the large-diameter gear can save the space corresponding to the gap. Therefore, a final product, or a machine, having the multi-stage gear installed therein can be provided with reduced size.

The multi-stage gear is made from a single workpiece and therefore can provide higher strength than the divided gear. Furthermore, because the multi-stage gear does not need joining and assembling, this gear can be configured with high coaxial accuracy at low cost.

According to the configuration (8), in addition to the operations and effects described in (6) or (7), the multi-stage gear is a single-piece multi-stage gear formed with the large-diameter gear on at least one side of the small-diameter gear. This can be provided according to the intended purposes.

For instance, the invention is applicable to a multi-stage gear formed with a small-diameter gear and a large-diameter gear, a multi-stage gear formed with a small-diameter gear in a middle part and large-diameter gears in both end parts, and others. Similarly, those various multi-stage gears are not formed with a gap between the small-diameter gear and the large-diameter gear. This can save the space corresponding to the gap and thus achieve space saving when the multi-stage gear is installed in a machine.

MODE FOR CARRYING OUT THE INVENTION

A detailed description of an embodiment of a method for manufacturing a multi-stage gear and the multi-stage gear embodying the present invention will now be given referring to the accompanying drawings.

<First Embodiment>

(Overall Configuration)

Figure 1:
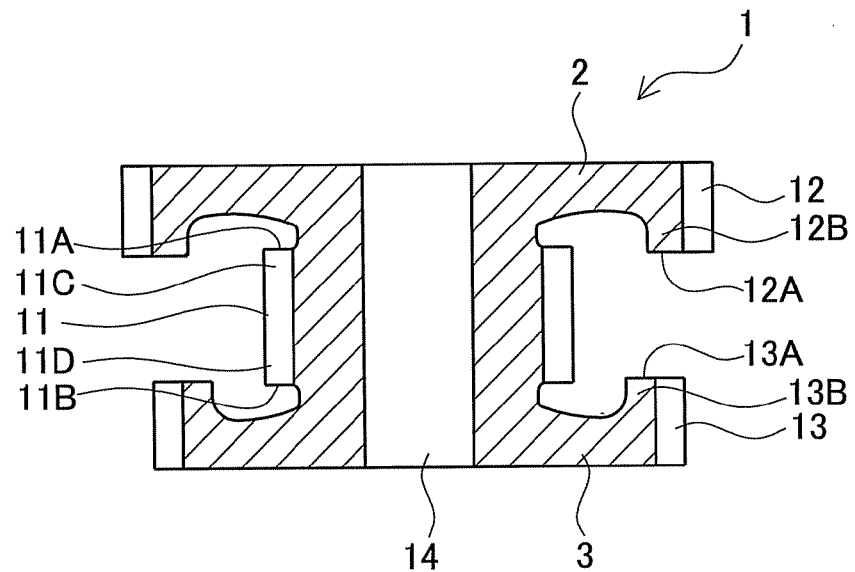
FIG. 1 is a conceptual cross sectional view of a multi-stage gear in a first embodiment.

FIG. 1 shows a conceptual cross sectional view of a multi-stage gear 1. The multi-stage gear 1 is made of a material such as metal allowing plastic deformation in the multi-stage gear manufacturing method mentioned later. The multi-stage gear 1 shown in FIG. 1 has a nearly hollow cylindrical shape formed with a center hole 14 through the center. The multi-stage gear 1 is formed, in a middle part on an outer periphery, with a small-diameter gear 11. On the outer periphery, large-diameter gears 12 and 13 are further formed above and below the small-diameter gear 11 in an axial direction.

In FIG. 1, the large-diameter gears 12 and 13 are provided on the outer periphery above and below the small-diameter gear 11 in the axial direction; alternatively, the large-diameter gear may also be provided on either one of the upper side and the lower side of the small-diameter gear 11 on the outer periphery in the axial direction. For instance, a multi-stage gear may be configured as a multi-stage gear 30 shown in FIG. 5 in which the large-diameter gear 12 and the small-diameter gear 11 are formed. Alternatively, a multi-stage gear may be configured such that two gears, a large-diameter gear 13 and a small-diameter gear 11, are provided so that the small-diameter gear is arranged at an end.

As shown in FIG. 1, an upper end face 11A of the small-diameter gear 11 and an end face 12A of the large-diameter gear 12 are located in about the same positions or level in the axial direction. Furthermore, a lower end face 11B of the small-diameter gear and an end face 13A of the large-diameter gear 13 are located in about the same positions or level in the axial direction. Accordingly, this multi-stage gear does not include any gap or interval between the small-diameter gear 11 and the large-diameter gear 12 and between the small-diameter gear 11 and the large-diameter gear 13. Since there is no gap or interval between the small-diameter gear 11 and the large-diameter gear 12 and between the small-diameter gear 11 and the large-diameter gear 13, the space can be saved by an amount corresponding to the gap. This can result in space saving when the multi-stage gear 1 is mounted in a machine.

The multi-stage gear 1 is made from a single workpiece 20 mentioned later. Thus, it can have large strength as compared with a divided gear. Specifically, the multi-stage gear 1 made from the single workpiece 20 provides strength directly deriving from the strength of plastically deformable metal or the like. It is superior in strength to the divided gear composed of joined separate parts. Furthermore, since no joining work is needed different from the divided gear, the multi-stage gear can be manufactured at low cost and with high coaxial accuracy.

(Method for Manufacturing the Multi-Stage Gear)

Figure 2:
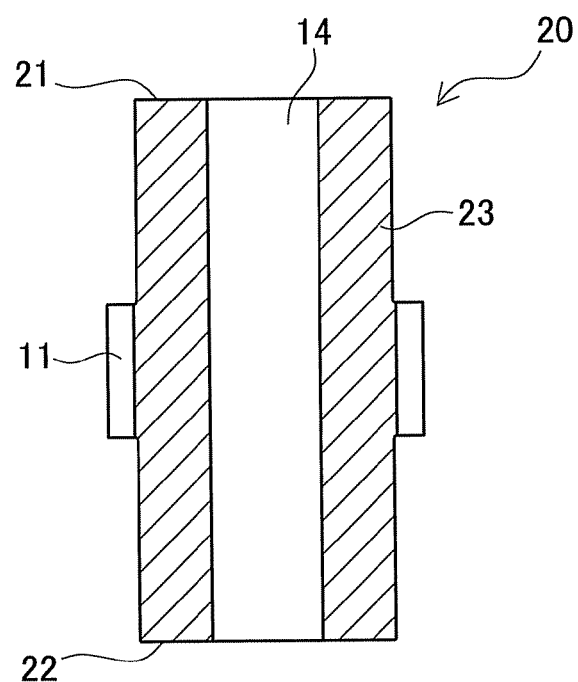
FIG. 2 is a conceptual cross sectional view showing a first step of a method for manufacturing the multi-stage gear in the first embodiment.
Figure 3:
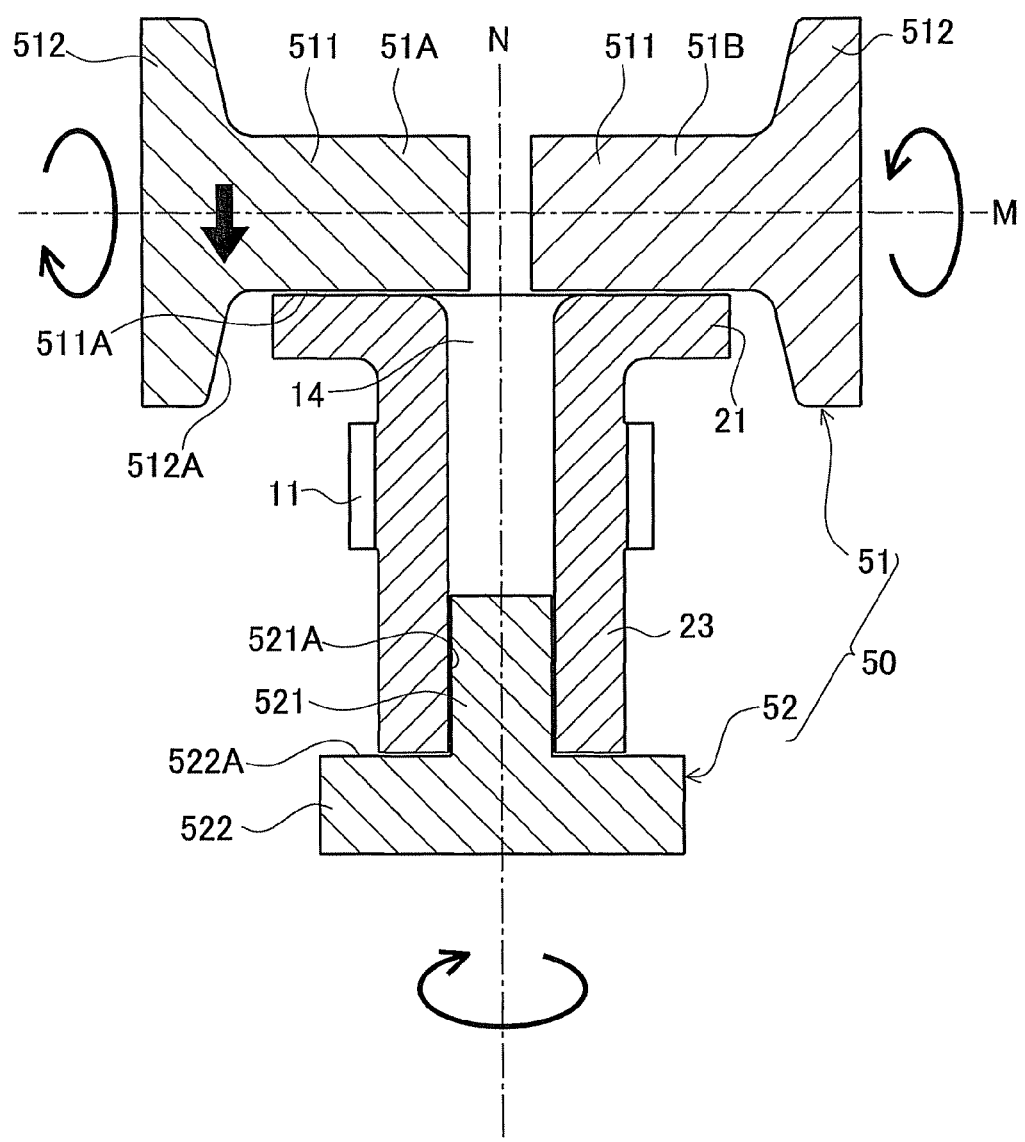
FIG. 3 is a conceptual cross sectional view showing a second step, phase 1, of the method for manufacturing the multi-stage gear in the first embodiment.
Figure 4:
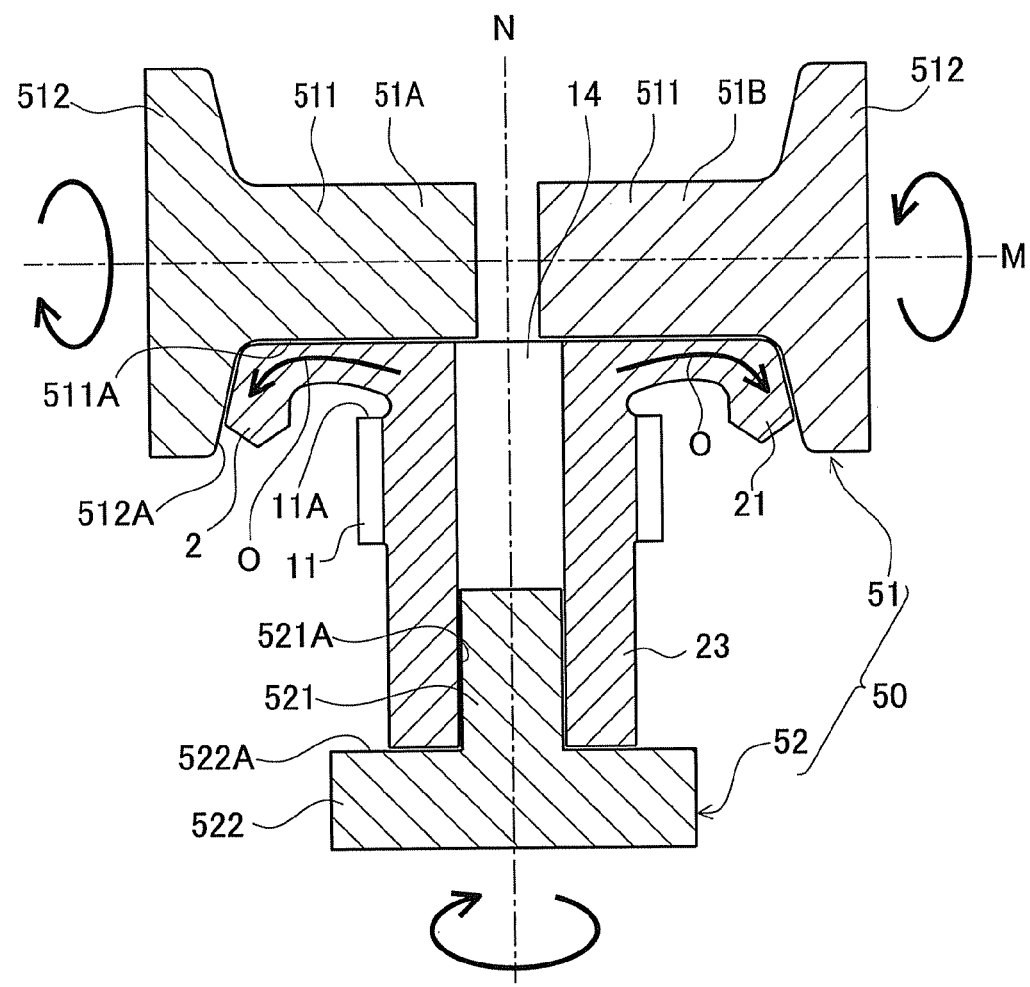
FIG. 4 is a conceptual cross sectional view showing the second step, phase 2, of the method for manufacturing the multi-stage gear in the first embodiment.
Figure 5:
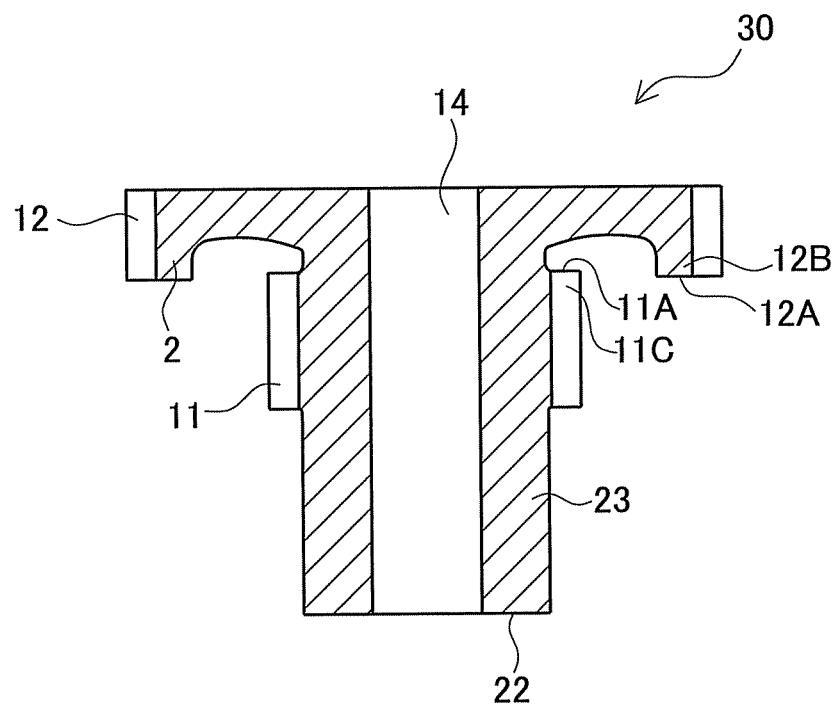
FIG. 5 is a conceptual cross sectional view showing a third step of the method for manufacturing the multi-stage gear in the first embodiment.
Figure 6:
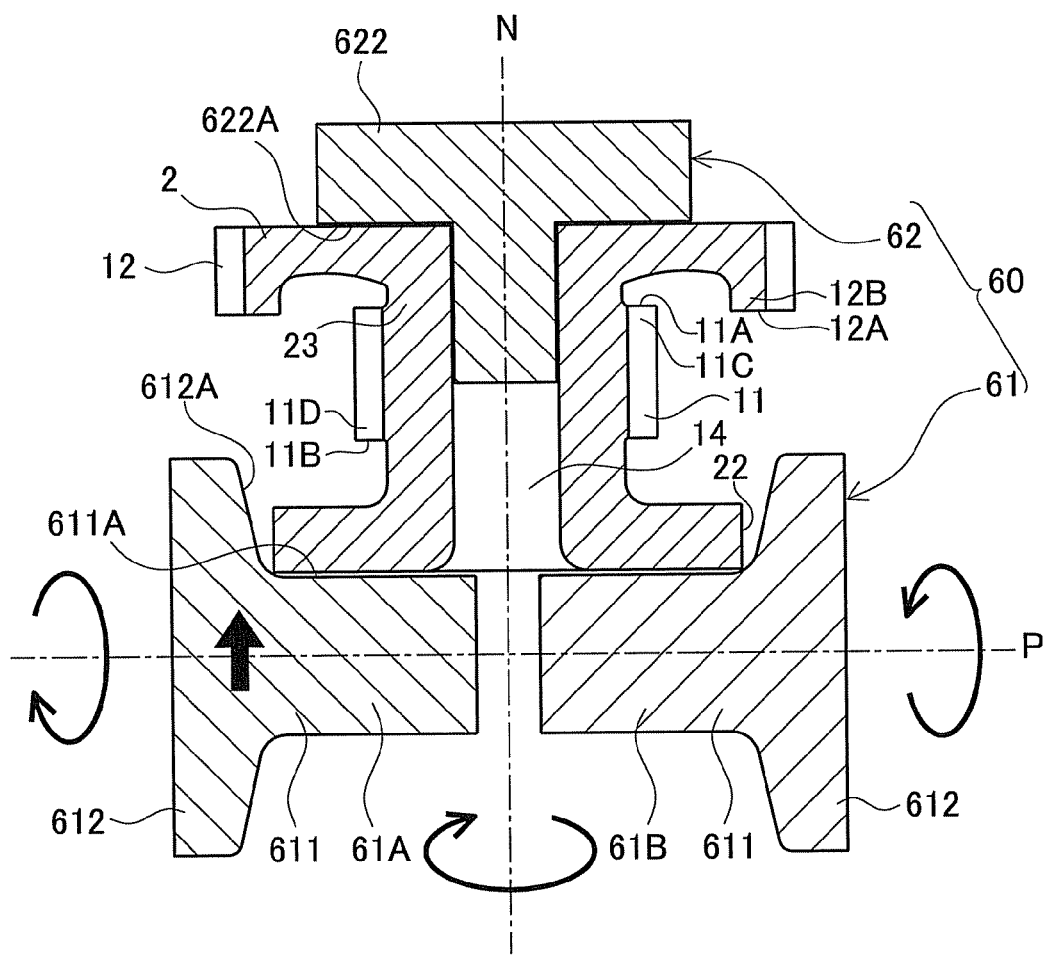
FIG. 6 is a conceptual cross sectional view showing a fourth step, phase 1, of the method for manufacturing the multi-stage gear in the first embodiment.
Figure 7:
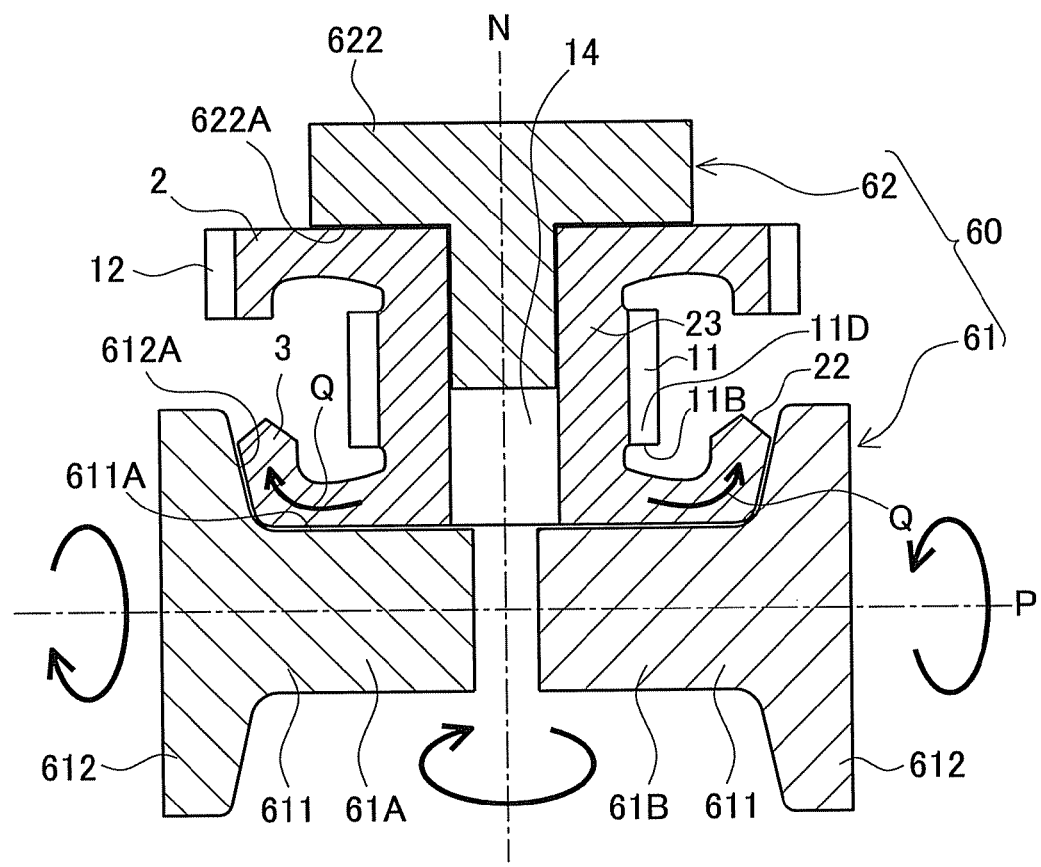
FIG. 7 is a conceptual cross sectional view showing the fourth step, phase 2, of the method for manufacturing the multi-stage gear in the first embodiment.
Figure 8:
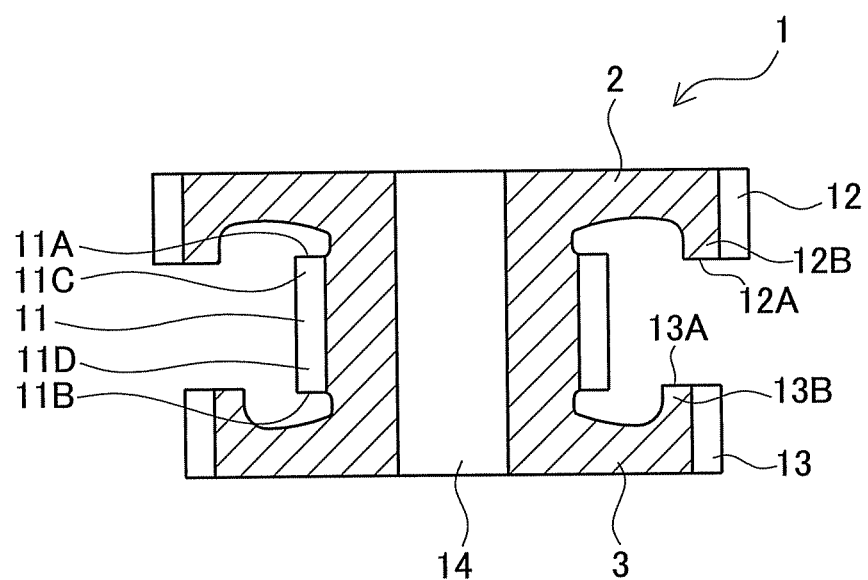
FIG. 8 is a conceptual cross sectional view showing a fifth step of the method for manufacturing the multi-stage gear in the first embodiment.

A method for manufacturing the multi-stage gear 1 in the present embodiment will be explained referring to FIGS. 2 to 8. FIG. 2 is a conceptual cross sectional view showing a first step of the multi-stage gear manufacturing method of the first embodiment. FIG. 3 is a conceptual cross sectional view showing a second step, phase 1, of the multi-stage gear manufacturing method of the first embodiment. FIG. 4 is a conceptual cross sectional view showing a second step, phase 2, of the multi-stage gear manufacturing method of the first embodiment. FIG. 5 is a conceptual cross sectional view showing a third of the multi-stage gear manufacturing method of the first embodiment. FIG. 6 is a conceptual cross sectional view showing a fourth step, phase 1, of the multi-stage gear manufacturing method of the first embodiment. FIG. 7 is a conceptual cross sectional view showing a fourth step, phase 2, of the multi-stage gear manufacturing method of the first embodiment. FIG. 8 is a conceptual cross sectional view showing a fifth step of the multi-stage gear manufacturing method of the first embodiment.

(First Step)

A first step is to form the small-diameter gear 11 in a middle part on the outer periphery of the workpiece 20 having a nearly hollow cylindrical shape. The workpiece 20 is first prepared. This workpiece 20 is made of a plastically deformable material such as metal. The workpiece 20 is formed in the nearly hollow cylindrical shape having a cylindrical portion which is for example 20 mm in thickness and 60 mm in outer diameter in the present embodiment. Successively, the small-diameter gear 11 shown in FIG. 2 is formed on the outer periphery of the workpiece 20. A method for forming the small-diameter gear 11 is selected from rolling, cutting, mounting, and others. The forming work of the small-diameter gear 11 is performed before the other large-diameter gears 12 and 13 are formed and thus this work will not affect the accuracy of the large-diameter gears 12 and 13. Therefore, any forming method is selectable.

(Second Step)

A second step is to form the large-diameter gear part 2 by plastically deforming an end portion 21 of the workpiece 20 so as to widen the diameter thereof. To plastically deform the workpiece 20 into a diameter-widened shape, a plastic deformation device 50 shown in FIG. 3 is used in the present embodiment.

The structure of the plastic deformation device 50 will be explained. The plastic deformation device 50 includes a flanged roller 51 and a fixed roller 52. The flanged roller 51 consists of two identically configured flanged rollers 51A and 51B. The flanged roller 51 is rotated about a central axis M extending in a direction perpendicular to a central axis N of the workpiece 20. The flanged roller 51 includes roller portions 511 and 511 each having a columnar shape and flanges 512 protruding from the corresponding roller portions 511 in an axial direction equal to the central axis N. Each roller portion 511 includes a press surface 511A for pressing the end portion 21. Each flange 512 has a forming surface 512A for forming a portion corresponding to the large-diameter gear part 2. The press surface 511A and the forming surface 512A are formed to be continuous to each other. Even though not illustrated, each press surface 511 A has such a shape that a portion closer to the flange 512 from the central axis N of the center hole 14 is located higher. Thus, each press surface 511A is slanted to a higher position toward the outer periphery. This shape can press the end portion 21 by a small force to plastically deform the same. The forming surfaces 512A are formed on an inner peripheral side of the flanges 512. The forming surfaces 512A each have such a shape that a portion farther away from the side continuous to the press surface 511A is at more distance from the central axis N.

The fixed roller 52 has a base portion 522 and a central fixed portion 521. The base portion 522 has a columnar shape with a larger diameter than the diameter of the nearly-cylindrical workpiece 20. Accordingly, an upper surface of the base portion 522 is provided as a mounting surface 522A to mount the workpiece 20 thereon. The columnar central fixed portion 521 is fixed in the center of the base portion 522. The diameter of the central fixed portion 521 is approximately equal to the diameter of the center hole 14 of the workpiece 20. Thus, when the central fixed portion 521 is inserted in the center hole 14 of the workpiece 20, the end portion 22 is put on the mounting surface 522A. Furthermore, the center hole 14 of the workpiece 20 contacts with a contact portion 521A and thus is fixed to the fixed roller 52.

The workpiece 20 is set in a fixed state to the fixed roller 52. The fixed roller 52 is rotated clockwise in the figure about the central axis N. Successively, the flanged roller 51A is rotated clockwise in the figure about the central axis M and the flanged roller 51B is rotated counterclockwise in the figure about the central axis M. Although the present embodiment exemplifies clockwise rotation of the fixed roller 52 and the flanged roller 51 in the figure and counterclockwise rotation of the flanged roller 51B, respective rotating directions may be changed arbitrarily.

As shown in FIG. 3, while the flanged roller 51 is being rotated, the press surfaces 511A are pressed against the end portion 21 of the workpiece 20. By a pressing force of the press surfaces 511A, the end portion 21 is plastically deformed outward in a radial direction of the workpiece 20. The workpiece 20 is thus plastically deformed along the press surfaces 511A as shown in FIG. 3. When the end portion 21 of the workpiece 20 is plastically deformed radially outward, this end portion 21 under plastic deformation is a portion far from the small-diameter gear 11. Accordingly, the small-diameter gear 11 is less influenced by the pressing force for plastic deformation, and the deformation of the small-diameter gear can be minimized.

As shown in FIG. 4, the flanged roller 51 is further pressed, the end portion 21 plastically deformed along the press surfaces 511A comes into contact with the forming surfaces 512A. Then, the end portion 21 is plastically deformed along the forming surfaces 512A in a direction indicated by arrows 0 almost parallel to a cylindrical portion 23 located close to the small-diameter gear 11. The end portion 21 is thus placed in a position overlapping the upper end face 11A of the small-diameter gear 11. When the end portion 21 is plastically deformed in the almost parallel direction to the cylindrical portion 23 near the small-diameter gear 11, the end portion 21 under deformation is located far from the small-diameter gear 11. Thus, the small-diameter gear 11 is less influenced by plastic deformation, and the deformation of the small-diameter gear can be reduced to a minimum.

(Third Step)

A third step is to form the large-diameter gear part 2 into the large-diameter gear 12, thereby producing the multi-stage gear 30. The multi-stage gear 30 is a multi-stage gear formed with two gears; small-diameter gear 11 and large-diameter gear 12. If the manufacturing method of the multi-stage gear is terminated in the third step, the multi-stage gear 30 having two gears; small-diameter gear 11 and large-diameter gear 12, can be produced.

As shown in FIG. 5, the large-diameter gear part 2 is formed into the large-diameter gear 12. To be concrete, the large-diameter gear part 2 is formed into such a shape that the upper end face 11A of the small-diameter gear 11 and the end face 12A of the large-diameter gear 12 are located in about the same positions in the axial direction. The method for forming the large-diameter gear 12 is selected from rolling, cutting, mounting, and others. Forming the large-diameter gear 12 is performed in a portion away from the small-diameter gear 11, so that the accuracy of the small-diameter gear 11 is less influenced. Therefore, any forming method can be adopted.

(Fourth Step)

A fourth step is to form the large-diameter gear part 3 by plastically deforming the end portion 22 of the multi-stage gear 30 so as to widen the diameter thereof. To plastically deform the multi-stage gear 30 into a diameter-widened state, a plastic deformation device 60 shown in FIG. 6 is used in the present embodiment.

The structure and the operations and effects of the plastic deformation device 60 are similar to those of the aforementioned plastic deformation device 50 shown in FIG. 4. Therefore, the details thereof are not explained herein. Parts of the plastic deformation device 60 are assigned reference signs beginning with "6" different from "5" of the reference signs in the plastic deformation device 50 as shown in FIGS. 6 and 7. In other respects, the plastic deformation device 60 is identical in structure to the plastic deformation device 50.

The multi-stage gear 30 is placed in a fixed state to a fixed roller 62. The fixed roller 62 is rotated clockwise in the figure about the central axis N. Successively, a flanged roller 61A is rotated clockwise in the figure about a central axis P and a flanged roller 61B is rotated counterclockwise in the figure about the central axis P. Although the present embodiment exemplifies clockwise rotation of the fixed roller 62 and the flanged roller 61A in the figure and counterclockwise rotation of the flanged roller 61B, their rotating directions may be changed arbitrarily.

As shown in FIG. 6, while the flanged roller 61 is being rotated, press surfaces 611A are pressed against the end portion 22 of the multi-stage gear 30. By a pressing force of the press surfaces 611A, the end portion 22 is plastically deformed outward in a radial direction. The multi-stage gear 30 is plastically deformed along the press surfaces 611A as shown in FIG. 6. When the end portion 22 of the multi-stage gear 30 is plastically deformed radially outward, this end portion 22 under plastic deformation is a portion far from the small-diameter gear 11. Accordingly, the small-diameter gear 11 is less influenced by the pressing force for plastic deformation, and the deformation of the small-diameter gear 11 can be minimized. The flanged roller 61 is smaller in size than the flanged roller 51. Since the flanged roller 61 is smaller than the flanged roller 51, the large-diameter gear 12 and the large-diameter gear 13 are formed with different sizes as shown in FIG. 1. Specifically, the size of a large-diameter gear to be formed can be adjusted according to the position of the flanges of the flanged roller.

As shown in FIG. 7, the flanged roller 61 is further pressed, the end portion 22 plastically deformed along the press surfaces 611A comes into contact with the forming surfaces 612A. Then, the end portion 22 is plastically deformed along the forming surfaces 612A in a direction indicated by arrows Q almost parallel to the cylindrical portion 23 located close to the small-diameter gear 11. The end portion 22 is thus placed in a portion overlapping a lower end face 11B of the small-diameter gear. When the end portion 22 is plastically deformed in the almost parallel direction to the cylindrical portion 23 near the small-diameter gear 11, the end portion 22 under deformation is located far from the small-diameter gear 11. Thus, the small-diameter gear 11 is less influenced by. plastic deformation, and the deformation of the small-diameter gear 11 can be reduced to a minimum.

(Fifth Step)

A fifth step is to form the large-diameter gear part 3 into the large-diameter gear 13, thereby producing the multi-stage gear 1. The multi-stage gear 1 is a multi-stage gear formed with three gears; small-diameter gear 11, large-diameter gear 12, and large-diameter gear 13.

As shown in FIG. 8, the large-diameter gear part 3 is formed into the large-diameter gear 13. To be concrete, the large-diameter gear part 3 is formed into such a shape that the lower end face 11B of the small-diameter gear 11 and an end face 13A of the large-diameter gear 13 are located in about the same positions in the axial direction. The method for forming the large-diameter gear 13 is selected from rolling, cutting, mounting, and others. Forming the large-diameter gear 13 is performed in a portion away from the small-diameter gear 11, so that the accuracy of the small-diameter gear 11 is less influenced. Therefore, any forming method can be adopted.

The first embodiment exemplifies, in FIG. 1, the method for manufacturing the multi-stage gear 1 in which the upper end face 11A of the small-diameter gear 11 close to the large-diameter gear 12 and the end face 12A of the large-diameter gear 12 close to the small-diameter gear 11 are located in about the same positions in the axial direction, and the lower end face 11B of the small-diameter gear 11 close to the large-diameter gear 13 and the end face 13A of the large-diameter gear 13 close to the small-diameter gear 11 are located in about the same positions in the axial direction, so that no gap is formed between the small-diameter gear 11 and the large-diameter gear 12 and between the small-diameter gear 11 and the large-diameter gear 13. Alternatively, the multi-stage gear may be manufactured such that an upper end portion 11C of the small-diameter gear 11 close to the large-diameter gear 12 and an end portion 12B of the large-diameter gear 12 close to the small-diameter gear 11 are located in overlapping positions in the axial direction and a lower end portion 11D of the small-diameter gear 11 close to the large-diameter gear 13 and an end portion 13B of the large-diameter gear 13 close to the small-diameter gear 11 are located in overlapping positions in the axial direction.

To manufacture the multi-stage gear in which the upper end portion 11C of the small-diameter gear 11 close to the large-diameter gear 12 and the end portion 12B of the large-diameter gear 12 close to the small-diameter gear 11 are located in overlapping positions in the axial direction, the large-diameter gear part 2 is formed into the large-diameter gear 12 in the third step so that the end portion 12B is positioned in a place overlapping the end portion 11C.

Furthermore, to manufacture the multi-stage gear in which the lower end portion 11D of the small-diameter gear 11 close to the large-diameter gear 13 and the end portion 13B of the large-diameter gear 13 close to the small-diameter gear 11 are located in overlapping positions in the axial direction, the large-diameter gear part 3 is formed into the large-diameter gear 13 in the fifth step so that the end portion 13B is positioned in a place overlapping the end portion 11D.

As explained in detail above, in the first embodiment including the first step of forming the small-diameter gear 11 in the outer peripheral surface 20A of the workpiece 20, the second step of forming the large-diameter gear part 2 by plastically deforming and widening the diameter of the end portion 21 of the workpiece 20, and the third step of forming the large-diameter gear 12 by cutting the large-diameter gear part 2, the multi-stage gear 30 can be manufactured in which no gap is formed between the small-diameter gear 11 and the large-diameter gear 12. This multi-stage gear 30 formed with no gap between the small-diameter gear 11 and the large-diameter gear 12 represents a multi-stage in which the upper end face 11A of the small-diameter gear 11 close to the large-diameter gear 12 and the end face 12A of the large-diameter gear 12 close to the small-diameter gear 11 are located in about the same positions in the axial direction and a multi-stage gear in which the upper end portion 11C of the small-diameter gear 11 close to the large-diameter gear 12 and the end portion 12B of the large-diameter gear 12 close to the small-diameter gear 11 are located in overlapping positions in the axial direction.

In addition, since there are further provided the fourth step of forming the large-diameter gear part 3 by plastically deforming and widening the diameter of the end portion 22 of the multi-stage gear 30, and the fifth step of forming the large-diameter gear 13 by cutting the large-diameter gear part 3, the multi-stage gear 1 can be manufactured in which no gap is formed between the small-diameter gear 11 and the large-diameter gear 12 and between the small-diameter gear 11 and the large-diameter gear 13. The multi-stage gear 1 formed with no gap between the small-diameter gear 11 and the large-diameter gear 12 and between the small-diameter gear 11 and the large-diameter gear 13 represents a multi-stage gear in which the upper end face 11A of the small-diameter gear 11 close to the large-diameter gear 12 and the end face 12A of the large-diameter gear 12 close to the small-diameter gear 11 are located in about the same positions in the axial direction and the lower end face 11B of the small-diameter gear 11 close to the large-diameter gear 13 and the end face 13A of the large-diameter gear 13 close to the small-diameter gear 11 are located in about the same positions in the axial direction and a multi-stage gear in which the upper end portion 11C of the small-diameter gear 11 close to the large-diameter gear 12 and the end portion 12B of the large-diameter gear 12 close to the small-diameter gear 11 are located in overlapping positions in the axial direction and the lower end portion 11D of the small-diameter gear 11 close to the large-diameter gear 13 and the end portion 13B of the large-diameter gear 13 close to the small-diameter gear 11 are located in overlapping positions in the axial direction.

According to the multi-stage gear 30 formed with no gap between the small-diameter gear 11 and the large-diameter gear 12, the small-diameter gear 11, the large-diameter gear 12, and the large-diameter gear 13, the space corresponding to the gap can be saved. Accordingly, a final product, or a machine, having the multi-stage gear installed therein can be provided with reduced size.

Even in the case where the large-diameter gear 12 is formed after formation of the small-diameter gear 11 or in the case where the large-diameter gears 12 and 13 are formed after formation of the small-diameter gear 11, there is no need to firmly retain the small-diameter gear 11 by a complex device configuration to avoid deformation. It is therefore possible to easily ensure the accuracy of gears and reduce the cost than conventional one.

Since the multi-stage gear 30 or multi-stage gear 1 is manufactured by plastic deformation, it can provide higher strength than the divided gear. Further, because of no necessity of joining and assembling, the multi-stage gear can be manufactured with high coaxial accuracy at low cost.

Since plastic deformation is conducted by the flanged roller 51 in the second step, the large-diameter gear 12 can be formed without causing deformation of the small-diameter gear 11 formed in the first step. Since plastic deformation is conducted by the flanged roller 61 in the fourth step, the large-diameter gear 13 can be formed without causing deformation of the small-diameter gear 11 formed in the first step.

<Second Embodiment>

A method for manufacturing a multi-stage gear in a second embodiment is identical to the multi-stage gear manufacturing method in the first embodiment excepting a second step and a fourth step to form large-diameter gear parts by plastically deforming end portions of a workpiece to widen the diameter thereof. Therefore, the second embodiment will be explained about a method for plastically deforming an end portion 41 of a workpiece 40. Explanations of other parts are omitted. The second embodiment, even though other parts are not explained, can provide the same operations and effects as those in the first embodiment. The following explanation is given only the second step. However, the same configuration for plastically deforming a workpiece in the second step also applies to the fourth step, thus providing the same operations and effects.

(Second Step)

The second step is to form the large-diameter gear part 2 by plastically deforming the end portion 41 of the workpiece 40 to widen the diameter thereof. To plastically deform the workpiece 40 into a diameter-widened state, in the present embodiment, a plastic deformation device 70 shown in FIG. 9 is used.

The structure of the plastic deformation device 70 will be explained. The plastic deformation device 70 is a hammer arranged to move up and down so that a leading end portion repeatedly beats the end portion 41 of the workpiece 40, thereby plastically deforming the end portion 41 and increasing the diameter thereof. The contact area of a contact surface 70A of the plastic deformation device 70 with the end portion 41 is determined small. Such a small contact area can decrease a forming load and reduce the influence of plastic deformation of the end portion 41 on the accuracy of the small-diameter gear 11. To provide a small contact area of the contact surface 70A, in the present embodiment, the contact area is determined to be smaller than the cross sectional area of the small-diameter gear 11. Owing to the smaller contact area than the cross sectional area of the small-diameter gear 11, the strength of the small-diameter gear 11 surpasses the forming load, making it possible to reduce the influence on the accuracy of the small-diameter gear 11.

Figure 9:
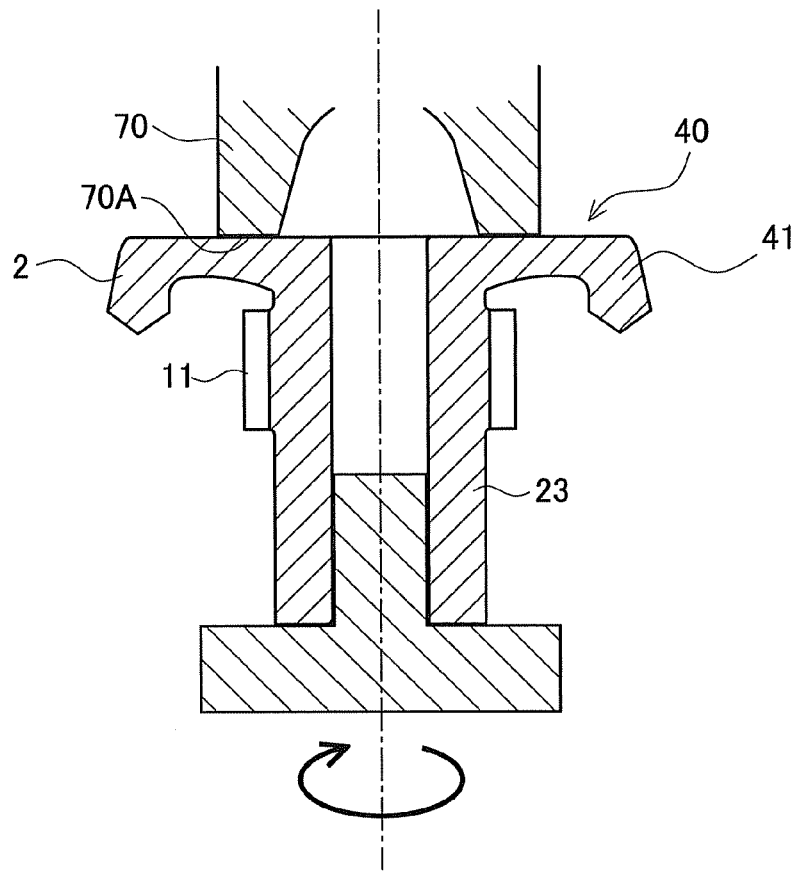
FIG. 9 is a conceptual cross sectional view showing a method for manufacturing a multi-stage gear in a second embodiment.

In the present embodiment, the contact surface 70A of the plastic deformation device 70 repeatedly beats the end portion 41 of the workpiece 40 in a state shown in FIG. 9, sequentially forming the end portion 41. Consequently, the end portion 41 of the workpiece 40 is plastically deformed, forming the large-diameter gear part 2. In the present embodiment, using the plastic deformation device 70 with the contact surface 70A having the contact area smaller than the cross sectional area of the small-diameter gear 11, the load during forming can be reduced. Accordingly, even when the large-diameter gear 12 is formed after formation of the small-diameter gear 11, the large-diameter gear 12 can be formed while deformation of the small-diameter gear 11 is minimized.

The method for manufacturing a multi-stage gear and the multi-stage gear according to the present invention is not limited to the above embodiments. The invention may be embodied in other specific forms without departing from the essential characteristics thereof.

Figure 10:
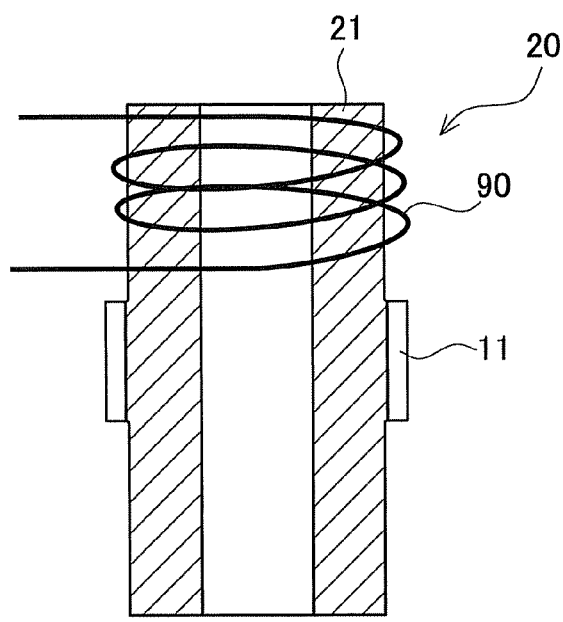
FIG. 10 is a conceptual cross sectional view showing a method for manufacturing a multi-stage gear in a third embodiment.
Figure 11:
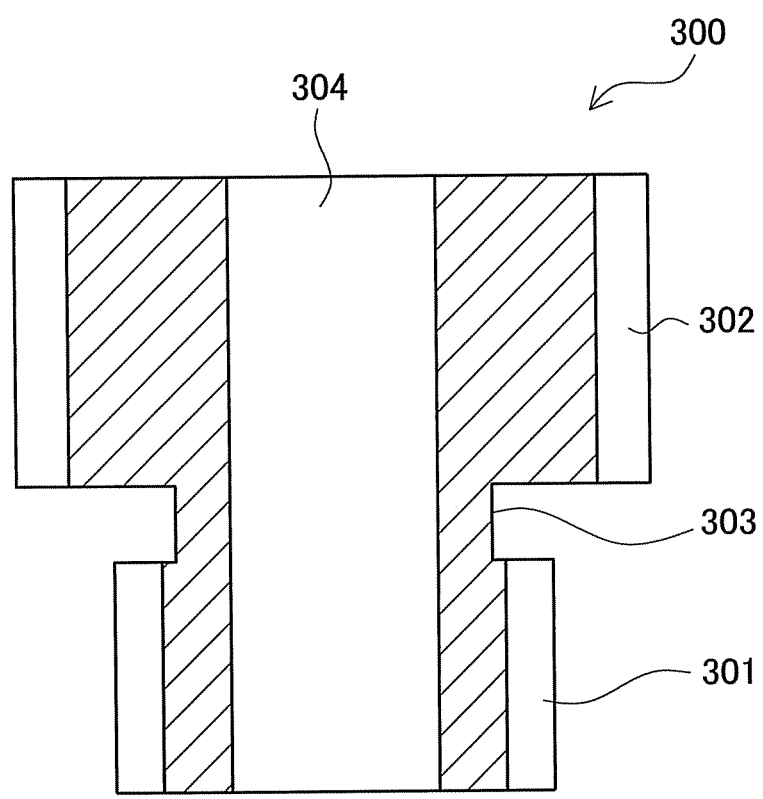
FIG. 11 is a conceptual cross sectional view of a multi-stage gear in a conventional art.

For instance, in the present embodiment, the second step and the fourth step are performed by cold forging to plastically deform an end portion of a workpiece to widen the diameter thereof. As an alternative, it may be configured such that an end portion 21 is heated by a coil 90 prior to the second step as shown in FIG. 10 of a third embodiment and then hot forging is performed to plastically deform a softened material of the end portion 21. By high-frequency heating using the coil 90, only part of the end portion 21 to be formed is decreased in material deformation resistance, thereby reducing a load required for plastic deformation. Since the high-frequency heating can heat only a part of a material to be processed, electric power saving during heating can be achieved. Although the above explanation is given only to the end portion 21 in the second step, the end portion 22 may also be heated prior to the fourth step. Such heating may be adopted during hammering in the second embodiment, so that the load required for plastic deformation can be reduced, and the deformation of the small-diameter gear 11 can be more reduced to a minimum.

In the present embodiment, for example, concrete values are presented about the workpiece 20, first multi-stage gear 30, and multi-stage gear 1. However, those values are mere examples for easy understanding. The invention is not limited by those values.

In the present embodiment, for instance, the large-diameter gear 12 is formed in the third step. As an alternative, the large-diameter gears 12 and 13 may be formed after the first, second, and fourth steps are performed. Specifically, after all plastic deformation is completed, the large-diameter gears 12 and 13 may be formed. By forming the large-diameter gears 12 and 13 after plastic deformation, the steps can be unified. This can speed up the manufacture of the multi-stage gear 1.

The present embodiment shows, as the multi-stage gear in which no gap is formed between the small-diameter gear and the large-diameter gear, the multi-stage gear in which the gear end portion of the small-diameter gear close to the large-diameter gear and the gear end portion of the large-diameter gear close to the small-diameter gear are located in about the same positions in the axial direction. However, for example, the multi-stage gear in which no gap is formed between the small-diameter gear and the large-diameter gear includes a multi-stage gear in which the end portion of the small-diameter gear and the end portion of the large-diameter gear are located in overlapping positions in the axial direction. Specifically, this is the multi-stage gear formed with no gap even in a state where the gear end portion of the large-diameter gear close to the small-diameter gear overlaps the gear end portion of the small-diameter gear close to the large-diameter gear so that the large-diameter gear overhangs the small-diameter gear. The present multi-stage gear can be manufactured by the above multi-stage gear manufacturing method by changing a forming amount in cutting the large-diameter gear part 2 or 3 in the third or fifth step. As long as the large-diameter gear overhangs the small-diameter gear, the multi-stage gear with no gap between the small-diameter gear and the large-diameter gear can be reliably manufactured.

REFERENCE SIGNS LIST

1, 30 Multi-stage gear
11 Small-diameter gear
12, 13 Large-diameter gear
20 Workpiece
50, 60 Plastic deformation device

The invention claimed is:

1. A method for manufacturing a multi-stage gear formed with gears having different diameters on an outer peripheral surface of a hollow cylindrical workpiece, the method including:
  a first step of forming a smaller-diameter gear on the outer peripheral surface;
  a second step of forming a larger-diameter gear part by plastically deforming an end portion of the workpiece to increase a diameter thereof;
  a third step of forming a larger-diameter gear by cutting the large-diameter gear part,
  wherein the plastic deformation in the second step includes widening the diameter of the end portion in a radial direction and bending the diameter-widened end portion toward the smaller-diameter gear, and
  wherein the second step includes hammering for the plastic deformation, and
  the hammering uses a hammer having a contact area smaller than a cross sectional area of the smaller-diameter gear.

2. The method for manufacturing a multi-stage gear according to claim 1, wherein the second step uses a flanged roller for the plastic deformation.

3. The method for manufacturing a multi-stage gear according to claim 1, wherein the second step includes heating the end portion of the workpiece by high-frequency heating.

* * * * *